(No Model.)

W. V. L. GRUBB & J. PEELING.
BOLT.

No. 513,182.          Patented Jan. 23, 1894.

Witnesses

Inventors

UNITED STATES PATENT OFFICE.

WILLIAM V. L. GRUBB AND JOSHUA PEELING, OF COLUMBUS, OHIO.

BOLT.

SPECIFICATION forming part of Letters Patent No. 513,182, dated January 23, 1894.

Application filed March 13, 1893. Serial No. 465,836. (No model.)

*To all whom it may concern:*

Be it known that we, WILLIAM V. L. GRUBB and JOSHUA PEELING, citizens of the United States, residing in Columbus, Franklin county, Ohio, have invented a certain new and useful Improvement in Bolts; and we do hereby declare that the following is a full, clear, and exact description of the invention, which will enable others skilled in the art to which it appertains to make and use the same, reference being had to the accompanying drawings, which form a part of this specification.

Our invention relates to a bolt, which, unlike other bolts, is used by inversely placing it in position, and when thus placed in such position, the head of said bolt is formed by certain contrivances automatically acting.

The object of our invention is to devise a bolt which can be used in an inaccessible place where it is not possible to insert the bolt in the ordinary way.

Figure 1:
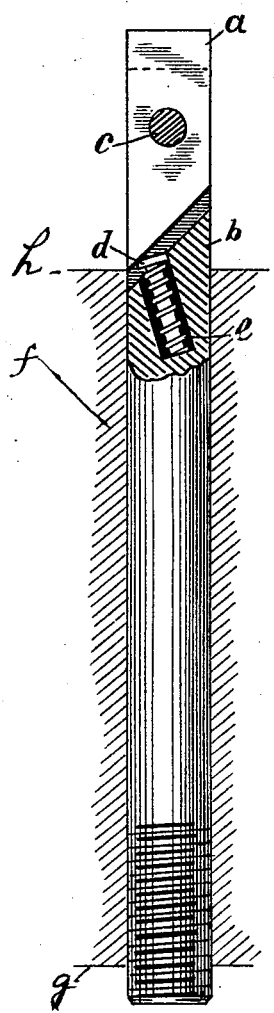
Figure 2:
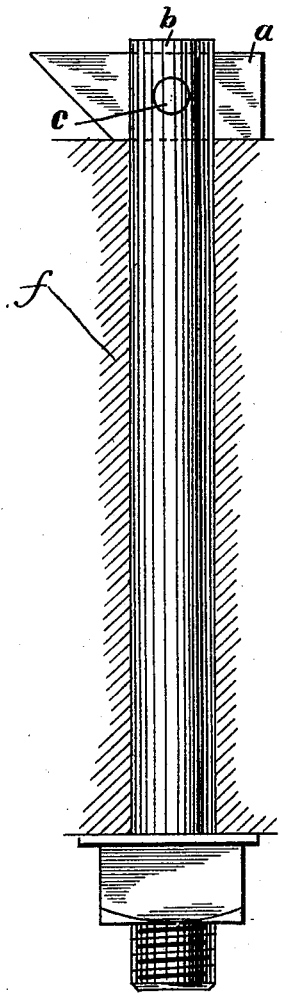
Figure 3:
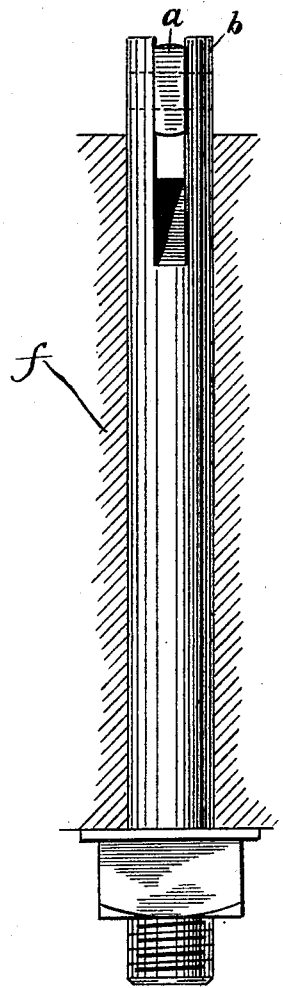

In the accompanying drawings Figure 1 shows a side view of said bolt "$b$" (a section of the same being removed) showing the spring "$e$" and the pin "$d$," which together tip the head "$a$" of the bolt, and the pin "$c$" on which the head "$a$" turns. Fig. "2" shows the position of the bolt after the same has been inserted through the wood "$f$" from below "$g$," and the lowest portion of the head of said bolt has just emerged from the top surface of said wood "$f$" at the point "$h$" with the spring "$e$" acting upon the head of the pin "$d$" tending to raise the point of "$a$" to a horizontal position as in Fig. "2." Head "$a$" being thus turned upon the pin "$c$" falls without the line of the bolt and the point will rest upon the upper surface of "$f$." The nut is then placed upon the bottom of the bolt and turned up to the position as shown in Fig. "2" which at the same time brings down the head of the bolt tightly upon the top of the wood "$f$." Fig. "3" exhibits a back view of the bolt.

We claim as our invention and desire to secure by Letters Patent—

In combination a bolt, screw-threaded at one end and provided at the other end with a slot, and a recess opening into said slot, a spring-pressed pin located in said recess, and a head pivoted in the slot having one end beveled to be engaged by said spring pressed pin, substantially as set forth.

In testimony that we claim the foregoing as our own we have hereto affixed our signatures in presence of two witnesses.

W. V. L. GRUBB.
JOSHUA PEELING.

Witnesses:
ADAM FAWCETT,
MILTON D. JAMES.